(12) United States Patent
Xia

(10) Patent No.: US 11,624,609 B1
(45) Date of Patent: Apr. 11, 2023

(54) FOLDABLE HORIZONTAL RULER

(71) Applicant: Ruisi Xia, Yongkang (CN)

(72) Inventor: Ruisi Xia, Yongkang (CN)

( * ) Notice: Subject to any disclaimer, the term of this patent is extended or adjusted under 35 U.S.C. 154(b) by 0 days.

(21) Appl. No.: 17/952,275

(22) Filed: Sep. 25, 2022

(51) Int. Cl.
*G01C 9/26* (2006.01)

(52) U.S. Cl.
CPC ..................... *G01C 9/26* (2013.01)

(58) Field of Classification Search
CPC ........................................ G01C 9/26
See application file for complete search history.

(56) References Cited

U.S. PATENT DOCUMENTS

| | | | | |
|---|---|---|---|---|
| 2,478,198 A | * | 8/1949 | Kroener | G01B 3/06 33/458 |
| D333,991 S | * | 3/1993 | Lee | D10/62 |
| 6,964,110 B2 | | 11/2005 | Shapiro | |
| 8,782,914 B1 | * | 7/2014 | DeLuca | G01B 3/06 33/458 |
| 10,317,183 B2 | * | 6/2019 | Squiers | G01B 3/06 |
| 10,690,470 B2 | * | 6/2020 | Squiers | G01B 3/06 |
| 2010/0229411 A1 | | 9/2010 | Lai | |
| 2016/0370162 A1 | * | 12/2016 | Squiers | G01B 3/563 |
| 2019/0249973 A1 | * | 8/2019 | Squiers | G01B 3/563 |

FOREIGN PATENT DOCUMENTS

| | | | | |
|---|---|---|---|---|
| CN | 205679149 U | * | 11/2016 | |
| CN | 107374640 A | * | 11/2017 | ............. A61B 3/112 |
| CN | 213167519 U | * | 5/2021 | |
| CN | 213812294 U | * | 7/2021 | |
| CN | 215930882 U | * | 3/2022 | |
| CN | 216770374 U | * | 6/2022 | |
| KR | 2021072590 A | * | 6/2021 | |

* cited by examiner

*Primary Examiner* — Yaritza Guadalupe-McCall
(74) *Attorney, Agent, or Firm* — Che-Yang Chen; Law Office of Michael Chen

(57) ABSTRACT

A foldable horizontal ruler, comprising a ruler body having at least two or more ruler units, wherein a connecting end is arranged on the ruler unit, a connecting block is arranged between the ruler units, and the connecting end forms a rotating kit with the connecting block so that the adjacent ruler units can be folded. The connecting end, arranged on the ruler unit, is provided with a connecting block, and the adjacent ruler units can be folded through the connecting block. The ruler body can be folded in multiple segments by designing more than one set of ruler body units, which makes the storage or carrying become more convenient. The magnet is arranged on the rotating shaft and the fixed pin, and the end of the ruler unit exposed. The magnet forms adsorption with the measured object, which reduces long-time lifting and reduces the user's level of fatigue.

6 Claims, 5 Drawing Sheets

FOLDABLE HORIZONTAL RULER

FIELD OF THE INVENTION

The present invention generally relates to rulers, in particular to a foldable horizontal ruler.

BACKGROUND OF THE INVENTION

Horizontal ruler is a measuring instrument that directly displays the angular displacement with leveling bubble based on the principle of liquid level, measuring the relative horizontal position, vertical position and deviation degree of inclination position of the measured surface.

At present, the horizontal ruler on the market is simple in structure and only could be folded for once. However, due to the longer length of ruler, it is still inconvenient to storage or carry it. In addition, the horizontal ruler is used by manual hand, which will greatly increase the user's fatigue level If it takes a long time to hold and measure.

SUMMARY OF THE INVENTION

The invention of folded horizontal ruler aims to effectively solve the technical problems existing in the prior technology.

The foldable horizontal ruler comprises a ruler body having at least two or more ruler units. In which, a connecting end is arranged on the ruler unit, a connecting block is arranged between the ruler units, and the connecting end forms a rotating kit with the connecting block so that the adjacent ruler units could be folded.

As a preferred implementation of this invention: the connecting end is embedded in the ruler unit, and the fixed pin is arranged on the ruler unit to fix the connecting end on the ruler unit. By this way, the connecting end is detachable arranged in the ruler unit, so as to facilitate its replacement.

As a preferred implementation of this invention: the connecting end is in a U-shape, the connecting block is arranged in an opening groove of the connecting end, and a rotating shaft is arranged to pass through both the connecting end and the connecting block. By this way, the connecting end and the connecting block are connected by rotating shaft.

As a preferred implementation of this invention: the magnet is arranged at the end of the fixed pin and the rotating shaft. The user's lifting force can be reduced by magnetic adsorption when the object to be measured is metal, which could reducing the user's exertion.

As a preferred implementation of this invention: the adjacent connecting ends on the ruler unit are in contact with each other and the fitting sides are arranged as arc edges, and the two ends of the connecting block are arranged as arc edges of the same size. The arrangement in this way increases the tightness of each component without causing collision within each ruler unit.

As a preferred implementation of this invention: the connecting end and the connecting block are provided with a plurality of ribs. This could reduce the amount of materials and ensure the firmness.

As a preferred implementation of this invention: a limiting slot is arranged on the bottom surface of the opening slot of the connection end, a limiting block is arranged on both ends of the connection block, the two ends of the connection block are in contact with the opening slot of the connection end and the limiting block is arranged in the limiting slot. This is beneficial to maintaining the unfolded state when the horizontal rule is fully unfolded.

As a preferred implementation of this invention: a hook part is arranged on the ruler unit at both ends of the ruler, the hook part is embedded in the ruler unit, and a bump is arranged on the hook part protruding from the surface of the ruler unit, so that the hook part can be fixed on the ruler unit. This arrangement is convenient for hooking the ruler unit on the wall.

Compared with the prior art, the present invention is advantageous because the connecting end arranged on the ruler unit is provided with the connecting block, and the adjacent ruler units can be folded through the connecting block. The ruler body could be folded in multiple segments by designing more than one set of ruler body units, which is convenient for storage and carry. 2. The magnet is arranged on the rotating shaft and the fixed pin, and the end of the ruler unit exposed. The magnet forms adsorption with the measured object, which reduces long-time lifting and reduces the user's level of fatigue.

DESCRIPTION OF THE DRAWINGS

The above and/or additional aspects and advantages of the invention may become apparent and readily understood from the description of the embodiments in conjunction with the following attached drawings, in which.

DETAILED DESCRIPTION OF THE PREFERRED EMBODIMENTS

Figure 1:
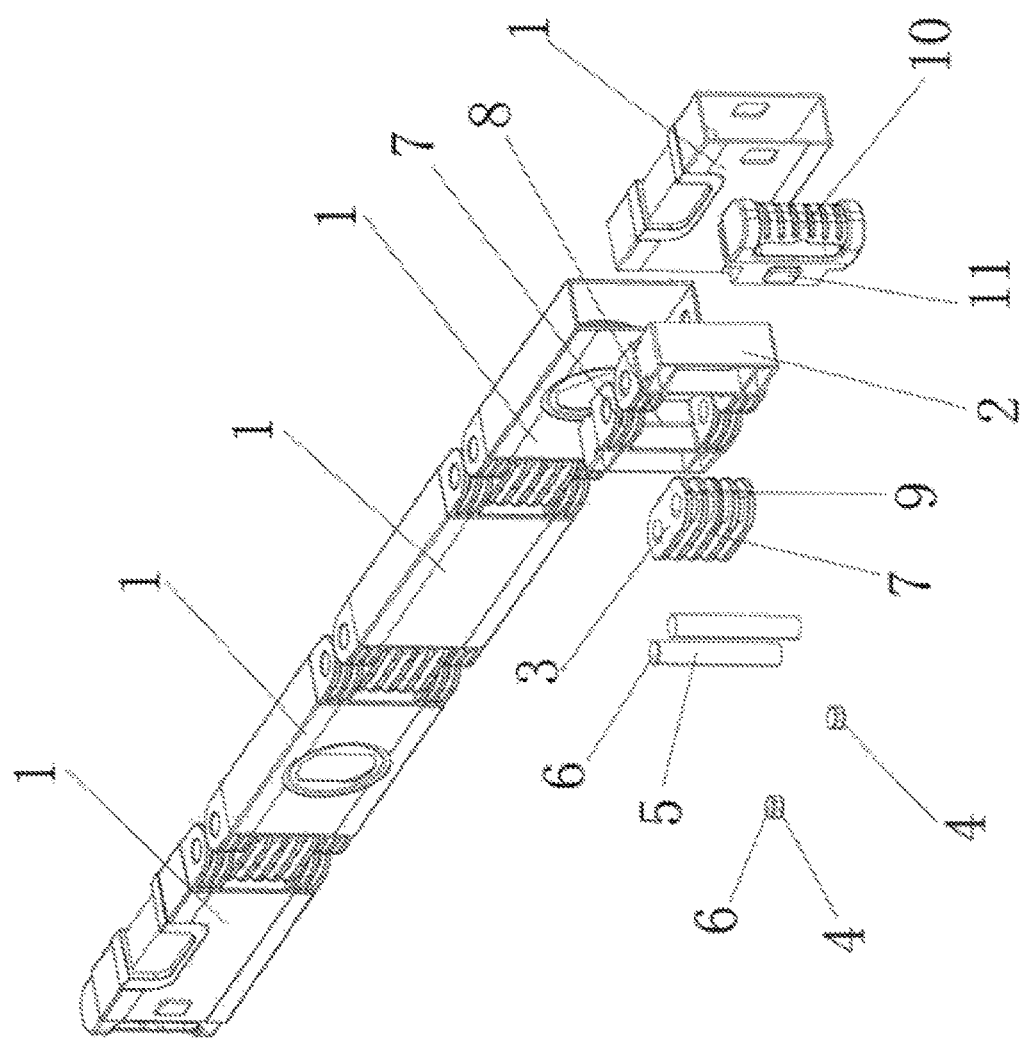
FIG. 1 is the perspective exploded view of the foldable horizontal ruler.
Figure 2:
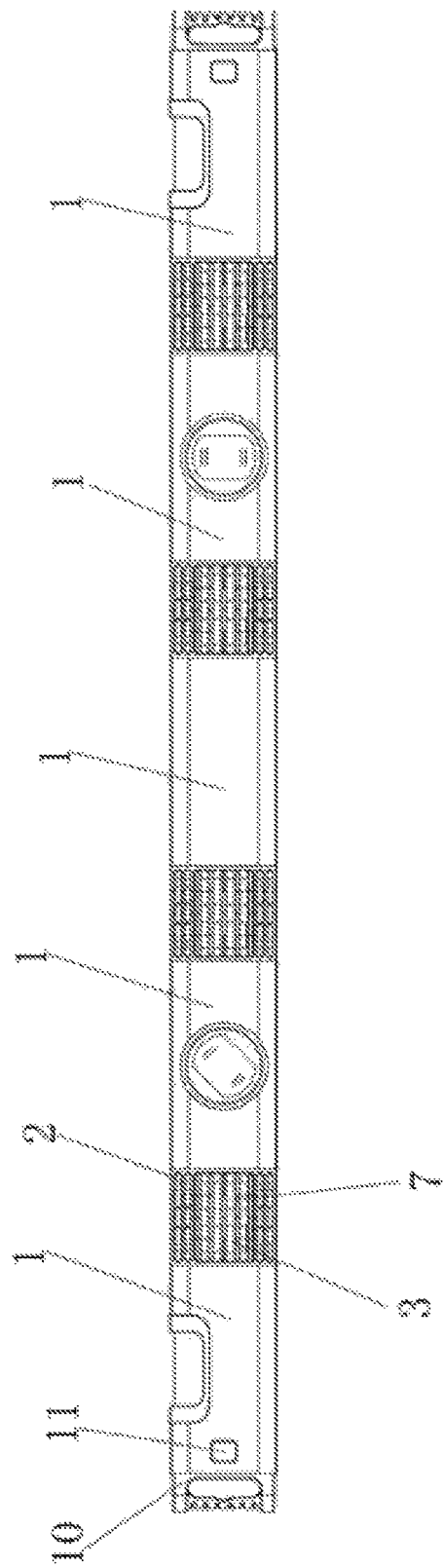
FIG. 2 is the front view of the foldable horizontal ruler.
Figure 3:
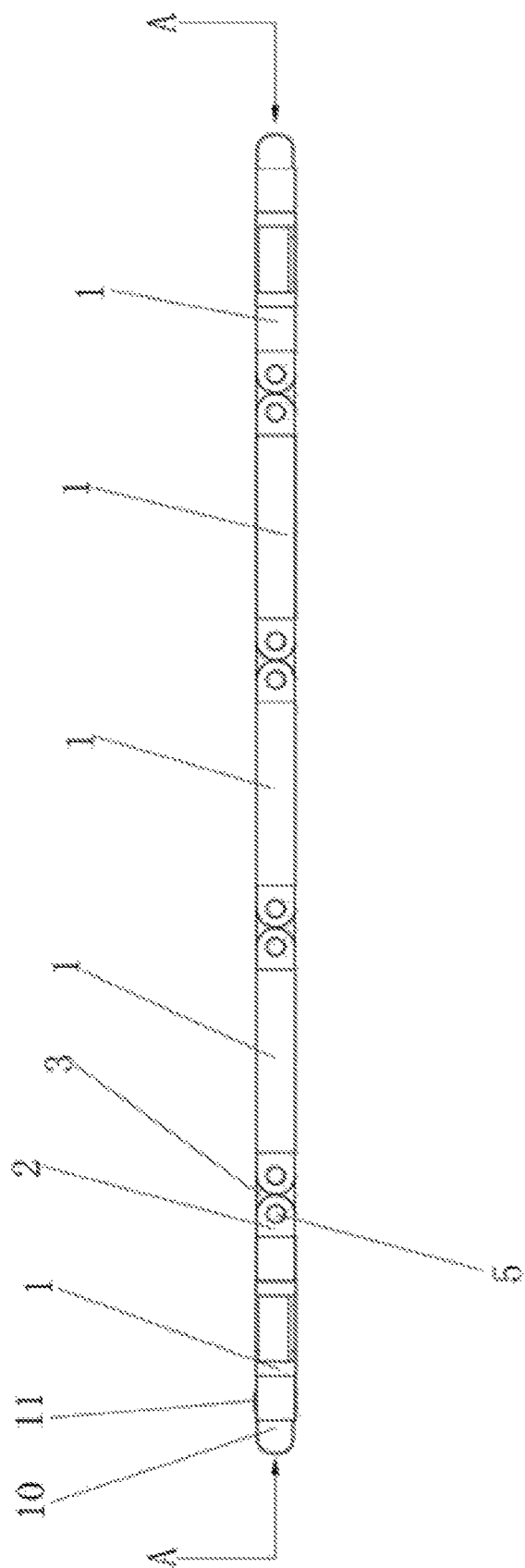
FIG. 3 is the top view of the foldable horizontal ruler.
Figure 4:
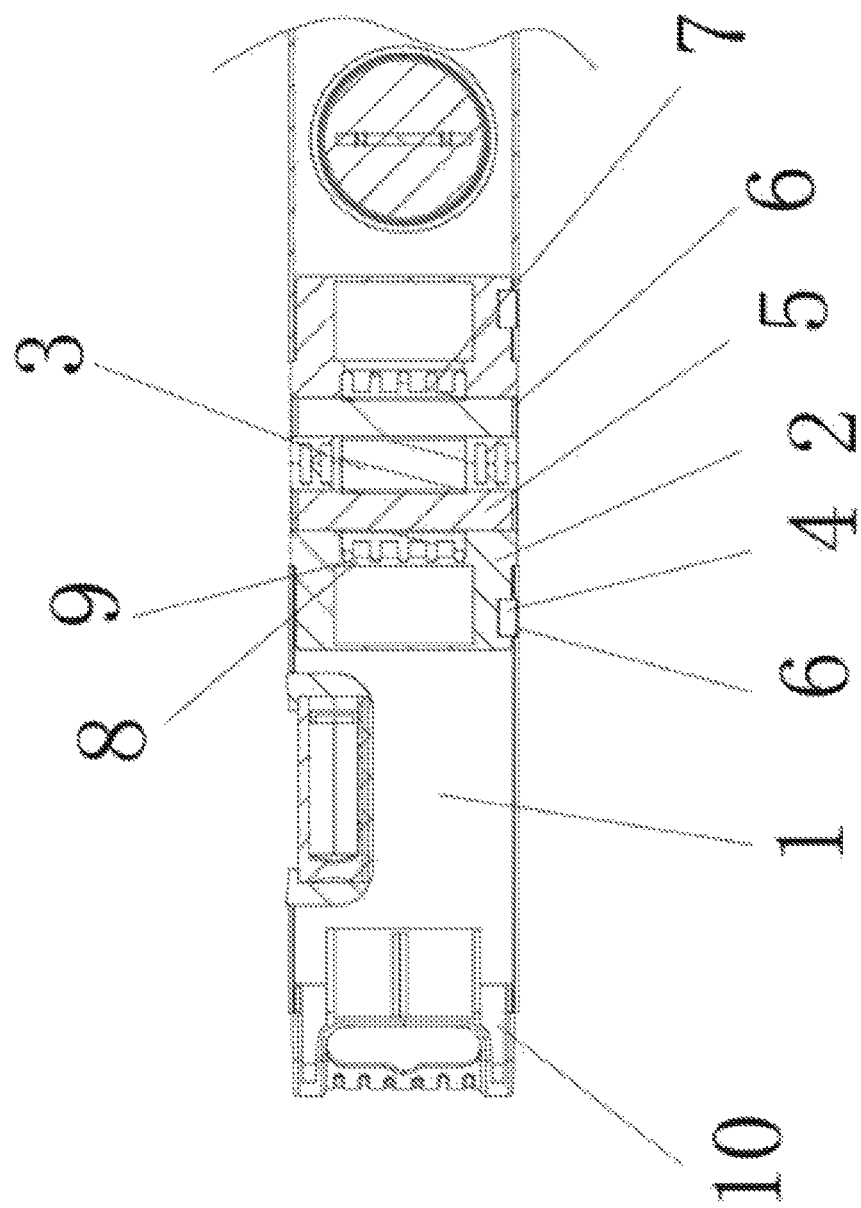
FIG. 4 is the cross-section view at A-A in FIG. 3 of the foldable horizontal ruler.
Figure 5:
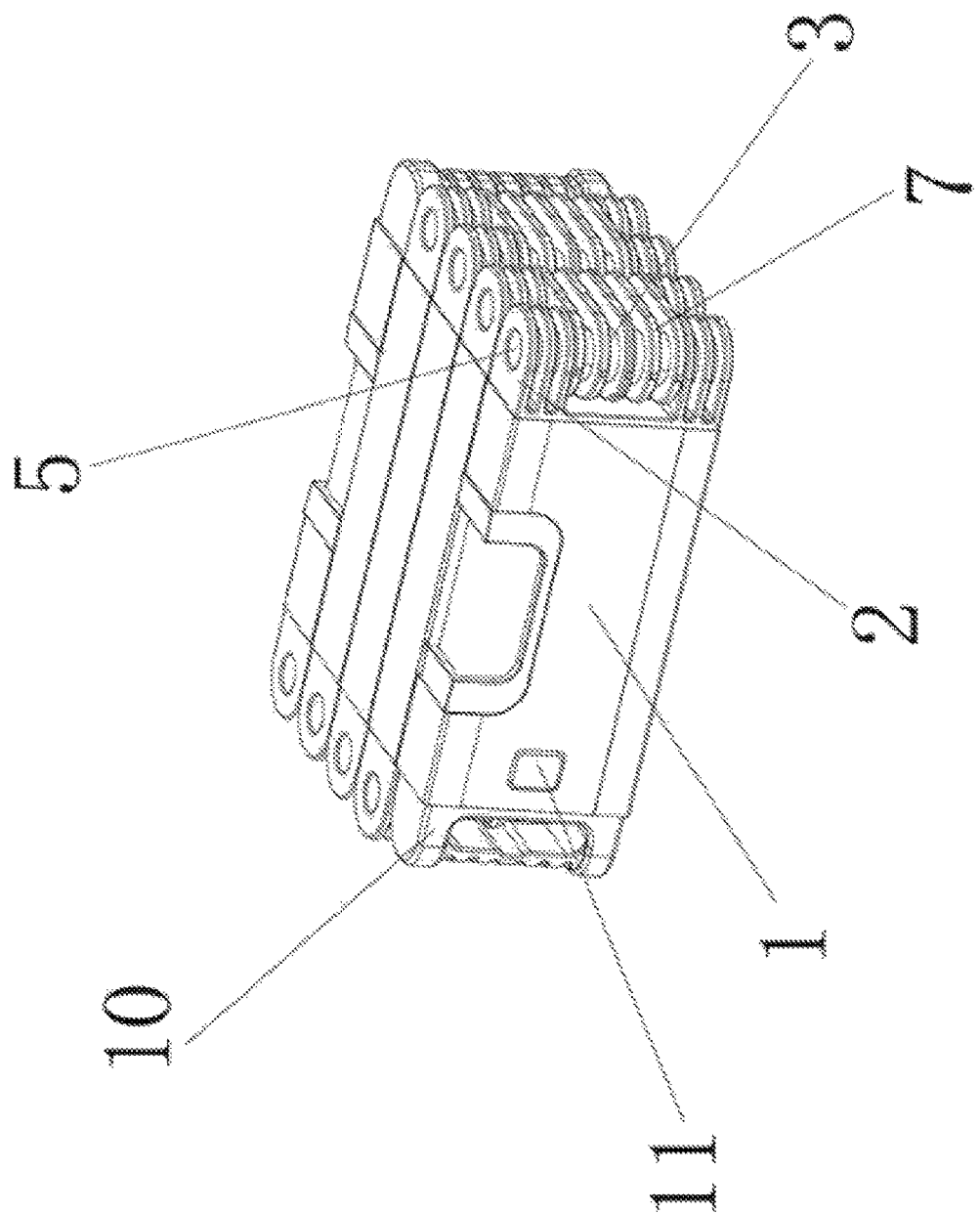
FIG. 5 is the perspective view of the folding configuration of the foldable horizontal ruler.

Referring to FIGS. 1-4, in the implementation of the present invention, a foldable horizontal ruler, comprising a ruler body having of at least two or more ruler units 1. In which, a connecting end 2 is arranged on the ruler unit 1, two of ruler units 1 are connected to the connecting end 2 relatively, the connecting block 3 is arranged between the ruler units 2, and the connecting end 2 forms a rotating kit with the connecting block 3 so that the adjacent ruler units can be folded.

Referring to the aforementioned structure, the connecting end 2 is embedded in the ruler unit 1, and this is to facilitate the replacement of the damaged connection end 2. The positioning groove and fixed pin 4 are arranged on the ruler unit 1. The fixed pin 4 is passed through the positioning groove and embedded in the connecting end 2, then the connecting end 2 could be fixed in the ruler unit 1.

Referring to the aforementioned structure, the portion of the connecting end 2 protruding from the ruler unit 1 is in U-shaped, the connecting block 3 is arranged in an opening groove of the connecting end 2, the through holes are simultaneously arranged on the connecting end 2 and the connecting block 3, two through holes are arranged on the connecting block 3, the rotating shaft 5 is arranged to pass through both the connecting end 2 and the connecting block 3, and the rotating shaft 5 and the through holes on connecting end 2 are interference fits, the rotating shaft 5 and the through holes on the connecting block 3 are clearance fits, so that the adjacent ruler units 1 could rotate with the rotating shaft 5 as the fulcrum.

In order to make the horizontal ruler could be adsorbed to the metal object during measuring, the magnet 6 is arranged at the end of the fixed pin 4 and the rotating shaft 5, and the magnet 6 is arranged to be exposed outside the ruler unit 1.

In order to prevent friction and collision of each of the ruler unit 1 during the rotation process, the connecting end 2 relative to the ruler unit 1 is arranged in arc-shaped, and the end points of the connecting end 2 are in contact with each other, which not only ensures that the ruler unit 1 will not create collision and friction during rotation, but also maintains the tightness of the connecting end 2 at both ends.

The shape of the connecting block 3 is waist circular, the radian on both sides of the connecting block 3 is kept consistent with that on the connecting end 2, a plurality of ribs 7 are arranged on the connecting end 2 and the connecting block 3. By the structure of ribs 7, it could ensure the firmness of the connecting end 2 and the connecting block 3, and reduce the material used during manufacture.

In order to maintain a certain firmness of the unfolded horizontal ruler and avoid unnecessary folding, the limiting slot 8 is arranged on the bottom surface of the opening slot of the connecting end 2, the limiting block 9 is arranged at the arc end point of the connecting block 3, both ends of the connecting block 3 are simultaneously contacted with the bottom surface of the connecting end 2 on the ruler unit 1 at both sides, and the limiting block 9 is embedded into the limiting slot 8. The cooperation between the limiting slot 8 and the limiting block 9 is unfixed, when the force applied to the ruler unit 1 exceeds a certain limit, the limiting block 9 could be separated from the limiting slot 8, so that the horizontal ruler could be in folded state. On the contrary, applying a certain force can also make the limiting block 9 re-insert into the limiting groove 8, so that the horizontal ruler can be in fully unfolded state.

In order to increase the functionality of the horizontal ruler, the hook part 10 is arranged at the ruler unit 1 on both sides of the horizontal ruler. The hook part 10 is arranged to be embedded in the ruler unit 1, and the bump 11 is arranged on the hook part 10. The bump 11 protrudes from the surface of the ruler unit 1, so that the hook part 10 can be fixed on the ruler unit 1. the nails could be be fixed on the wall, and the vacant part of the hook part 10 can be fixed so that the horizontal ruler can be hooked on the wall.

The working process of the present invention is as follows: the horizontal ruler could be changed from unfolded state to folded state by rotating any of ruler unit 1, then the limiting block 9 could be separated from the limiting slot 8, the ruler unit 1 could be folded around the rotating shaft 5, then the connecting end 2 is in the vertical relationship with the connecting block 3 after folded. This operation is performed on each of the ruler unit 1 to complete the storage of the horizontal ruler. When the magnet 6 is used for adsorption, the side of the fixed pin 4 and the rotating shaft 5 on the horizontal ruler should be closed to the object to be measured. The horizontal ruler could be adsorbed on the object to be measured by the adsorption between the magnet 6 and the metal.

While the description above refers to the particular embodiments of the present invention, it will be understood that many modifications may be made without departing from the spirit thereof. Any equivalent replacement or modification would fall within the protection scope of the present invention.

What is claimed is:

1. A foldable horizontal ruler, comprising a ruler body having at least two or more ruler units (1), wherein a connecting end (2) is arranged on each ruler unit (1), a connecting block (3) is arranged between the ruler units (1), and the connecting end (2) forms a rotating kit with the connecting block (3) so that the adjacent ruler units (1) can be folded, wherein the connecting end (2) is embedded in the ruler unit (1), and a fixed pin (4) is arranged on the ruler unit (1) to fix the connecting end (2) on the ruler unit (1), and wherein the connecting end (2) is in a U-shape, the connecting block (3) is arranged in an opening groove of the connecting end (2), and a rotating shaft (5) is arranged to pass through both the connecting end (2) and the connecting block (3).

2. The foldable horizontal ruler according to claim 1, wherein the magnet (6) is arranged at the end of the fixed pin (4) and the rotating shaft (5).

3. The foldable horizontal ruler according to claim 1, wherein adjacent connecting ends on the ruler unit (1) are in contact with each other and the fitting sides are arranged as arc edges, and the two ends of the connecting block (3) are arranged as arc edges of the same size.

4. The foldable horizontal ruler according to claim 1, characterized in that: the connecting end (2) and the connecting block (3) are provided with a plurality of ribs (7).

5. The foldable horizontal ruler according to claim 1, characterized in that: a limiting slot (8) is arranged on the bottom surface of the opening slot of the connection end (2), a limiting block (9) is arranged on both ends of the connection block (3), the two ends of the connection block (3) are in contact with the opening slot of the connection end (2) and the limiting block (9) is arranged in the limiting slot (8).

6. The foldable horizontal ruler according to claim 1, characterized in that: a hook part (10) is arranged on the ruler unit (1) at both ends of the ruler, the hook part (10) is embedded in the ruler unit (1), and a bump (11) is arranged on the hook part (10) protruding from the surface of the ruler unit (1), so that the hook part (10) can be fixed on the ruler unit (1).

* * * * *